July 4, 1944.   D. G. GRISWOLD   2,352,629
FLUID DISTRIBUTION AND CONTROL APPARATUS
Original Filed May 17, 1939   8 Sheets-Sheet 1
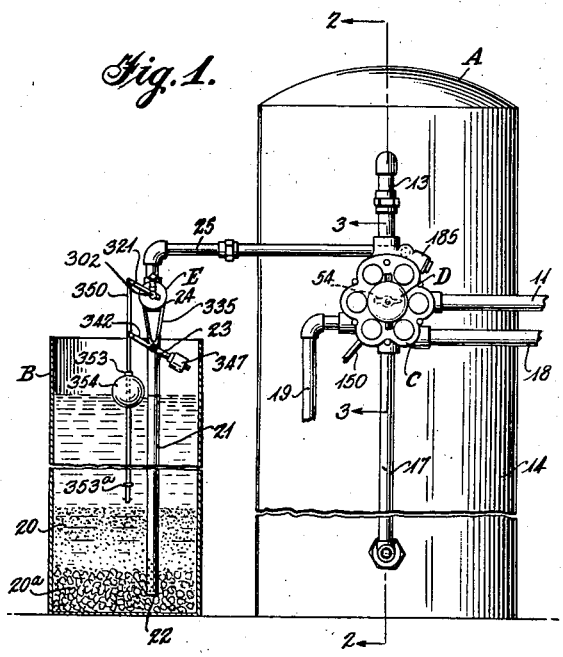
Fig. 1.
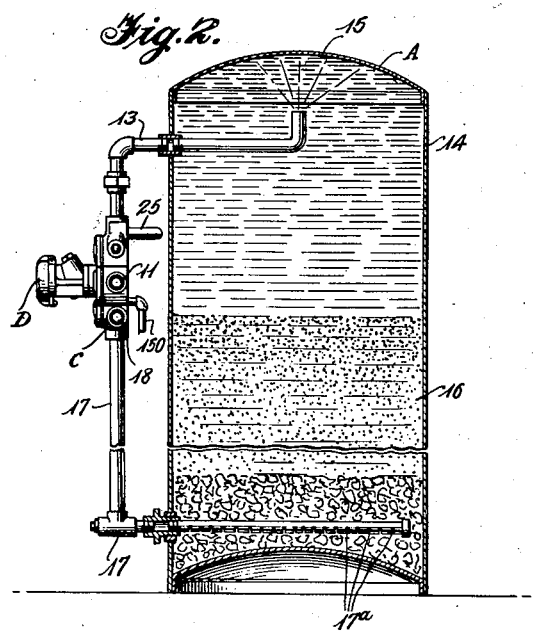
Fig. 2.
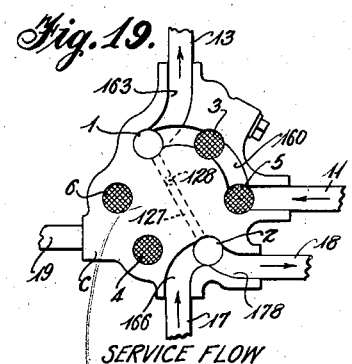
Fig. 19. SERVICE FLOW
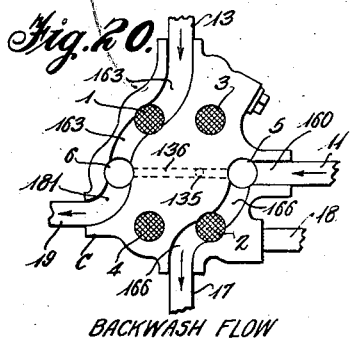
Fig. 20. BACKWASH FLOW
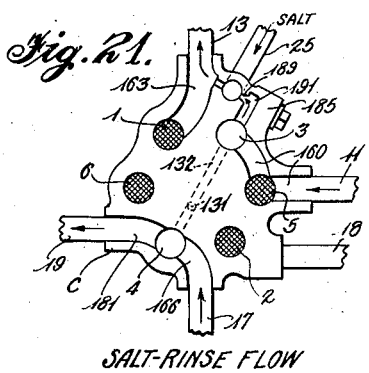
Fig. 21. SALT-RINSE FLOW
INVENTOR
Donald G. Griswold
BY
Bacon + Thomas
ATTORNEYS

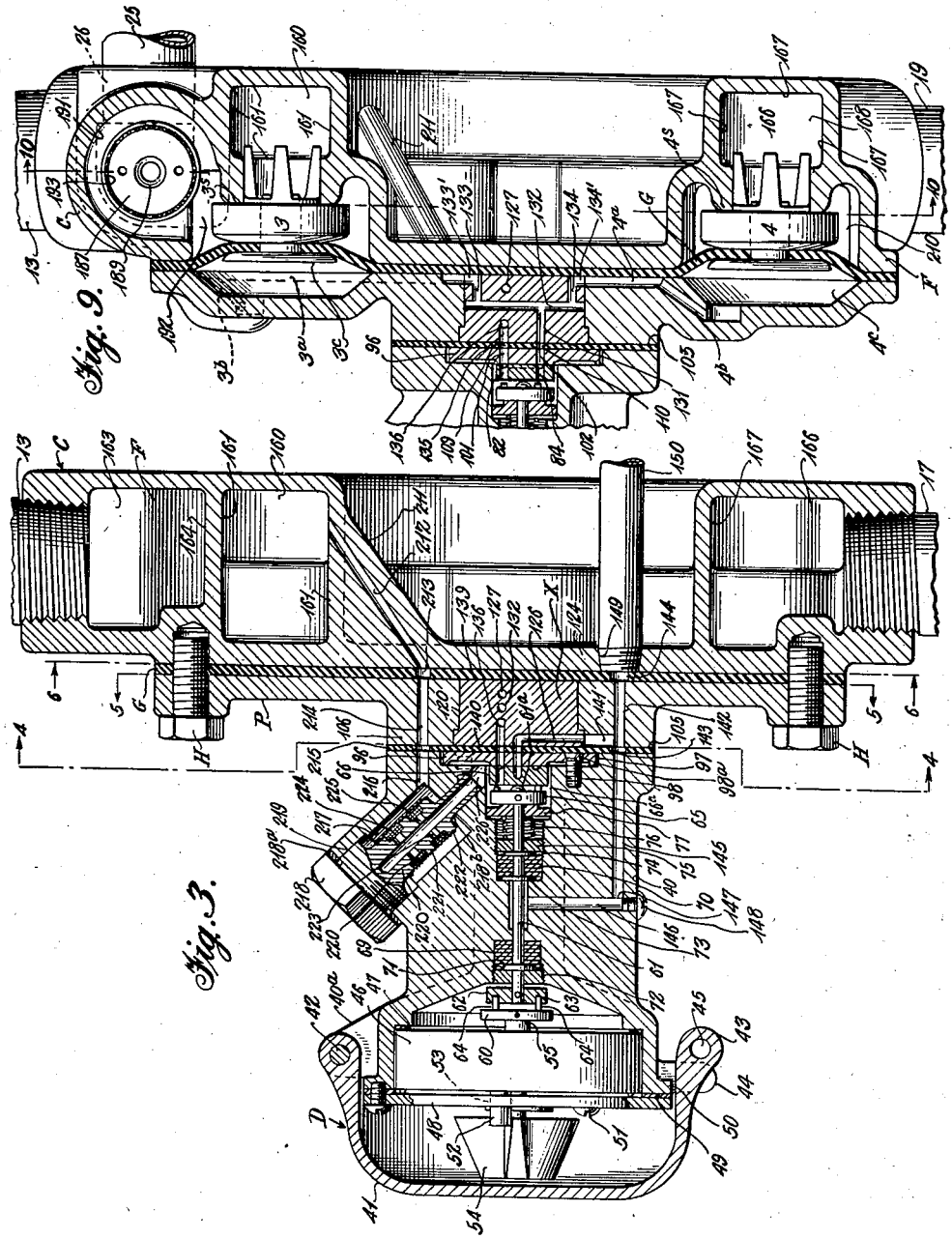

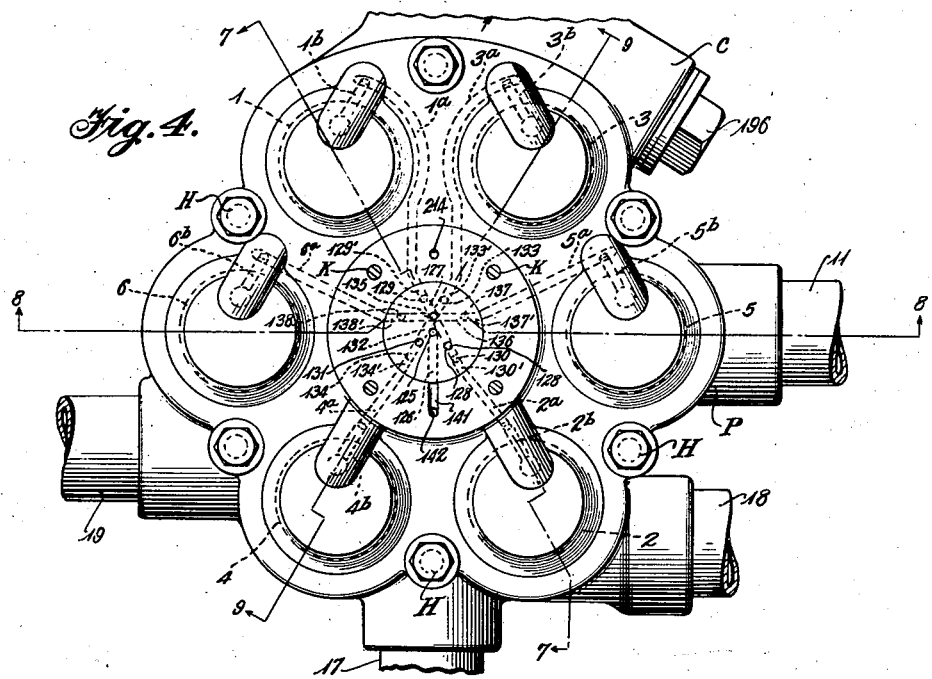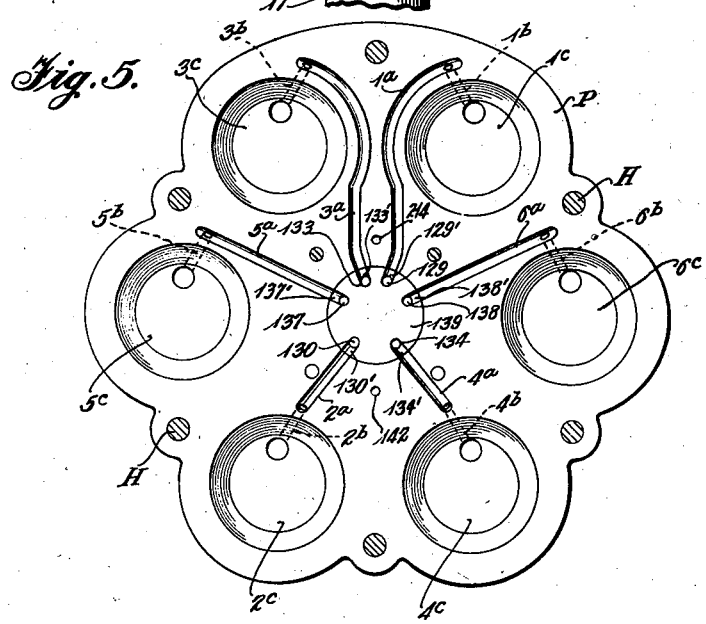

July 4, 1944.　　　D. G. GRISWOLD　　　2,352,629
FLUID DISTRIBUTION AND CONTROL APPARATUS
Original Filed May 17, 1939　　　8 Sheets-Sheet 4
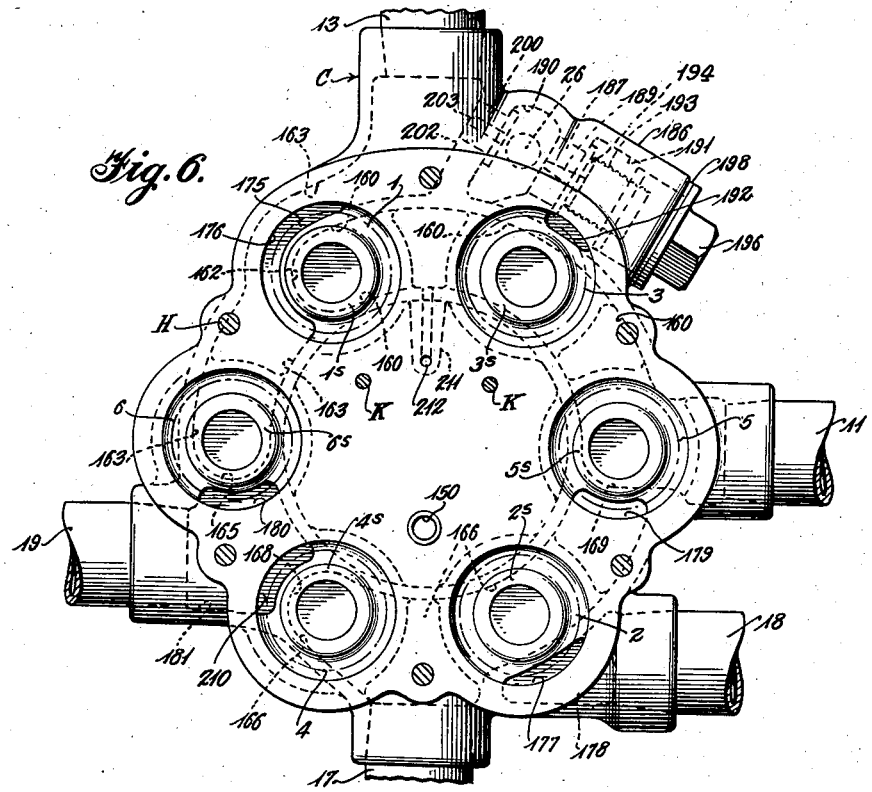
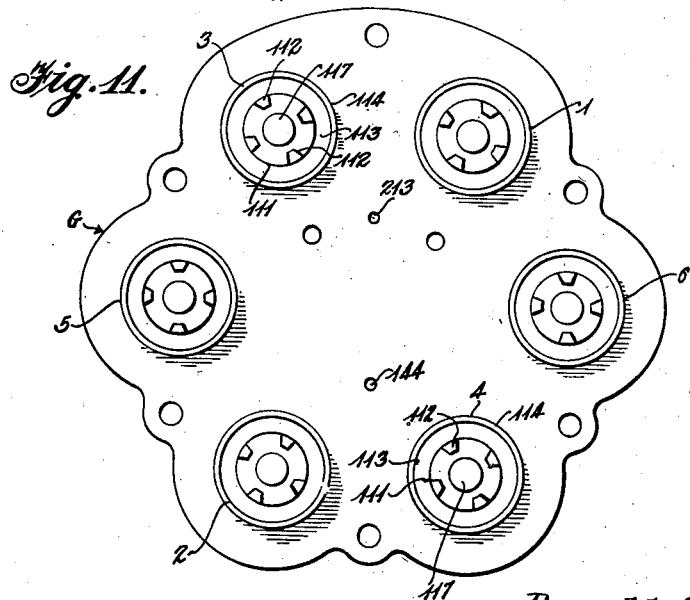
INVENTOR
Donald G. Griswold
BY
Bacon + Thomas
ATTORNEYS

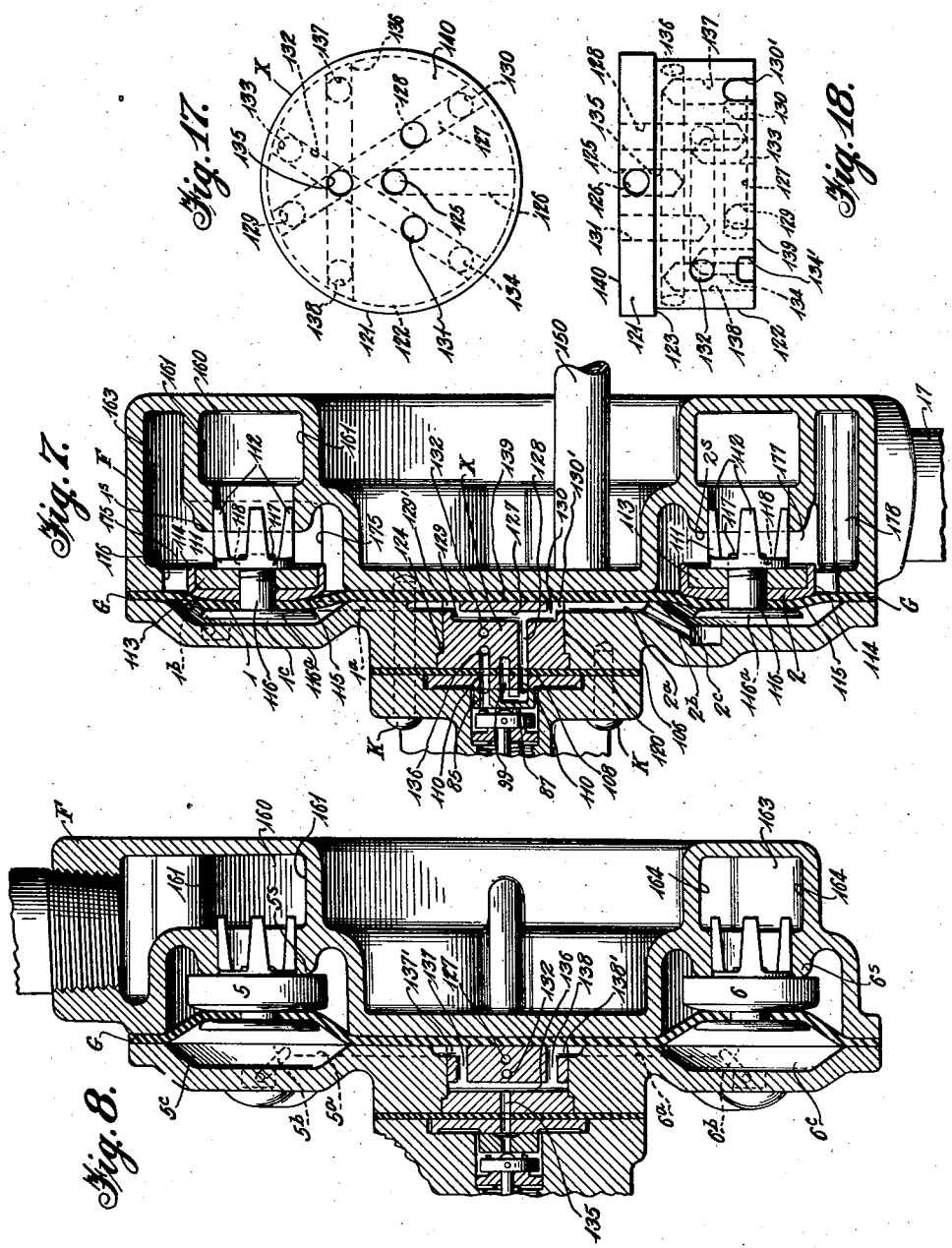

July 4, 1944.                    D. G. GRISWOLD                    2,352,629
                    FLUID DISTRIBUTION AND CONTROL APPARATUS
                    Original Filed May 17, 1939    8 Sheets-Sheet 6
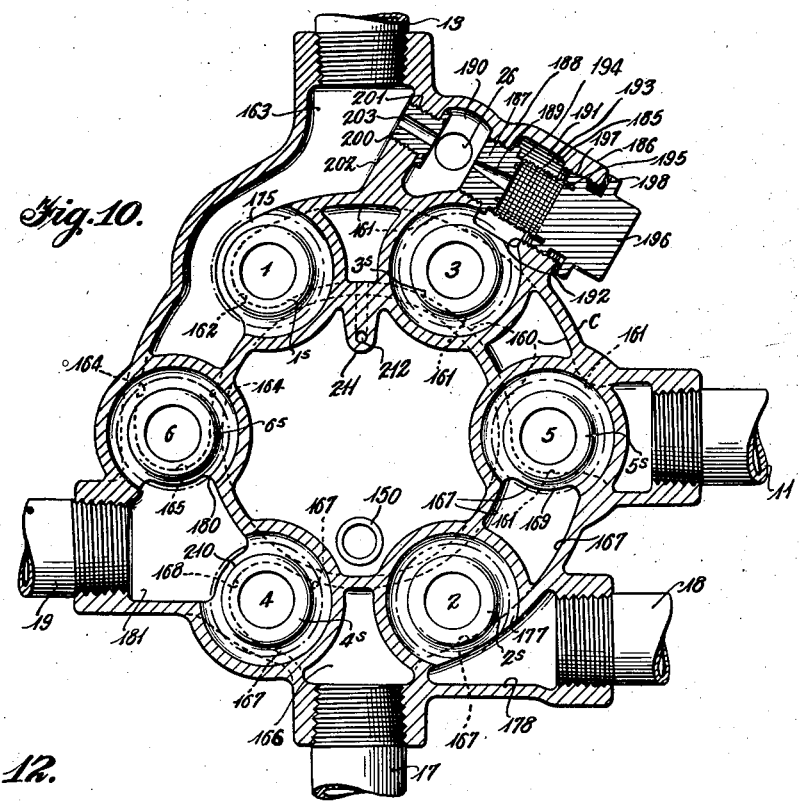
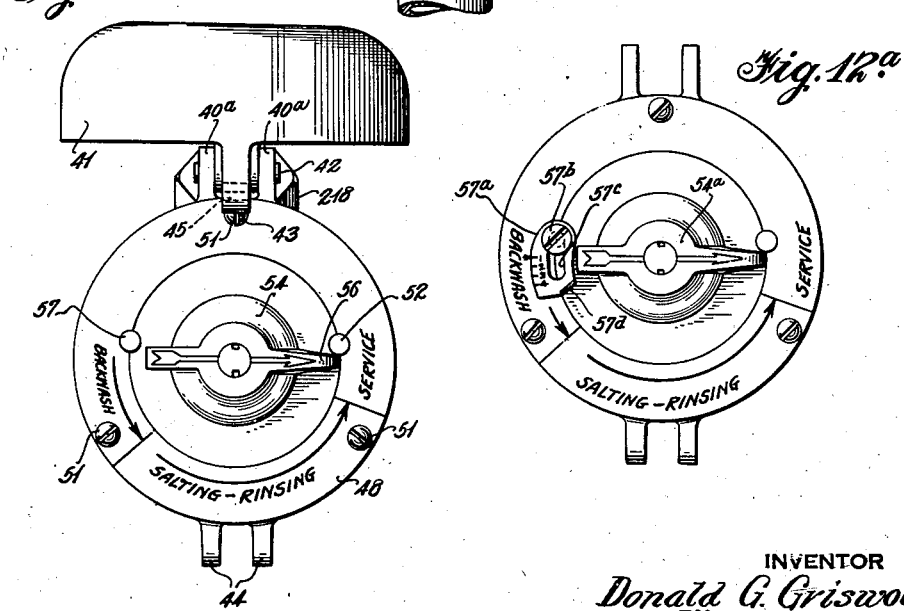
INVENTOR
Donald G. Griswold
BY
Bacon + Thomas
ATTORNEYS

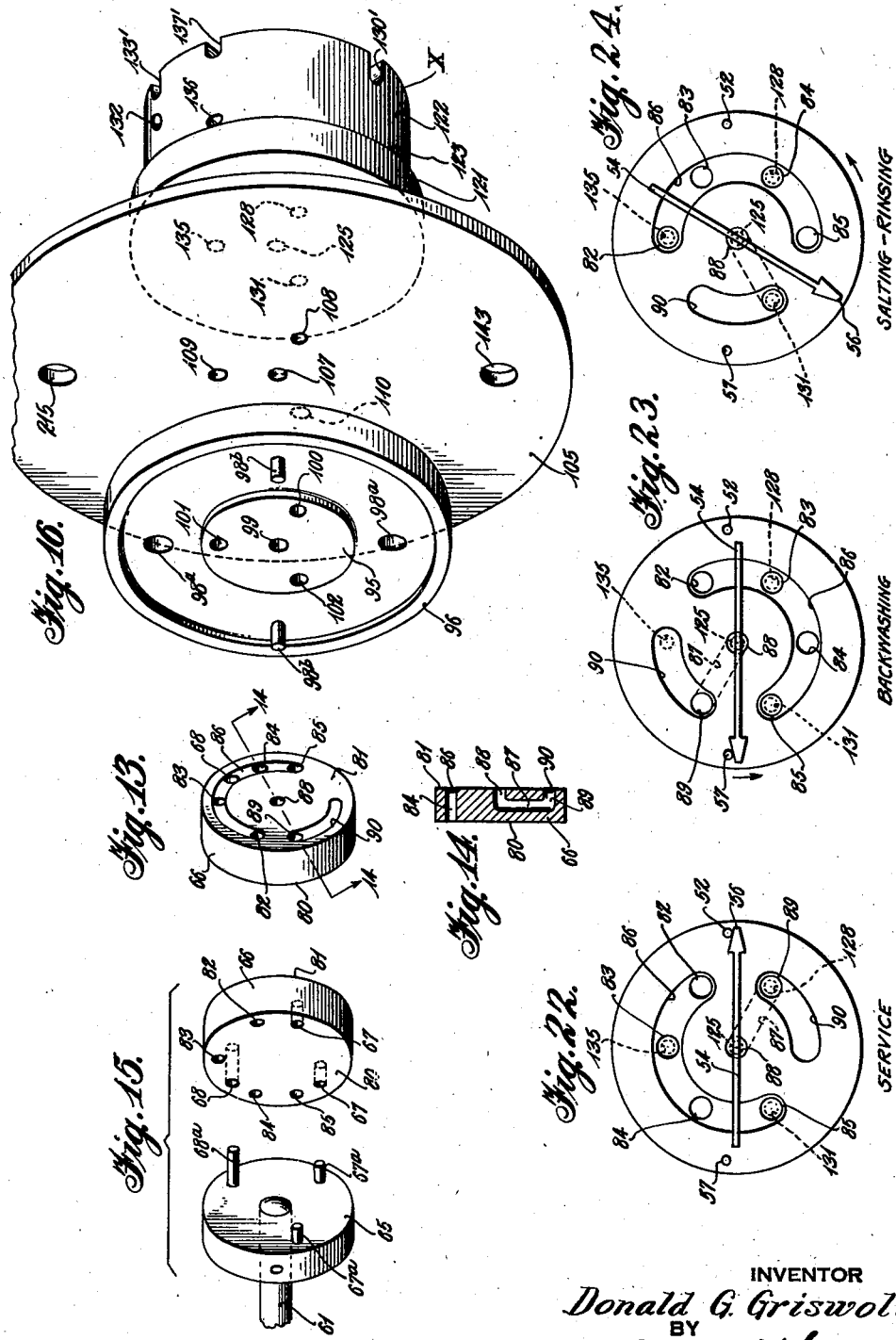

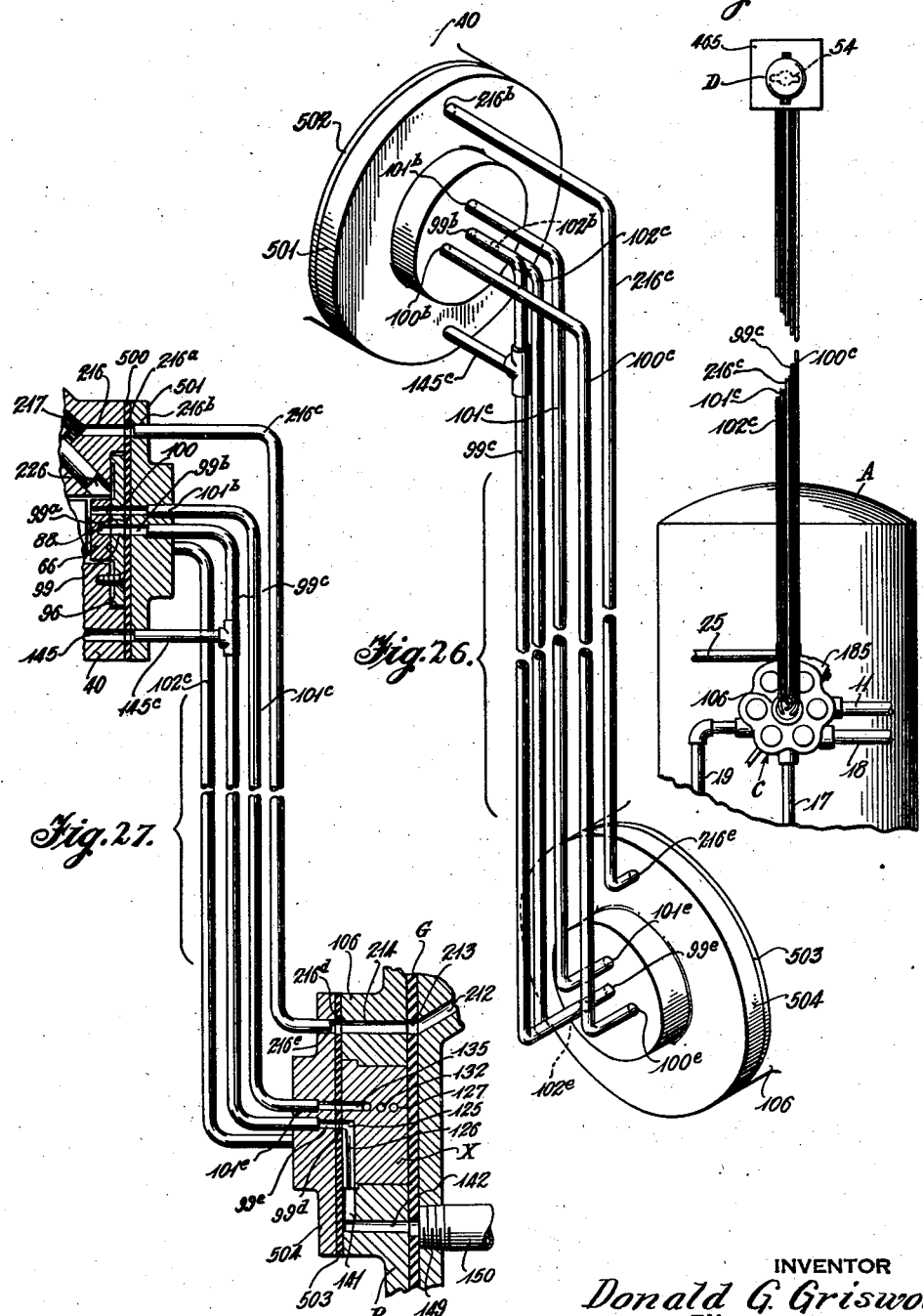

Patented July 4, 1944

2,352,629

UNITED STATES PATENT OFFICE 2,352,629

FLUID DISTRIBUTION AND CONTROL APPARATUS

Donald G. Griswold, Alhambra, Calif., assignor to Clayton Manufacturing Company, Alhambra, Calif.

Original application May 17, 1939, Serial No. 274,288, now Patent No. 2,243,815, dated May 27, 1941. Divided and this application March 11, 1941, Serial No. 382,802

16 Claims. (Cl. 137—144)

The present invention relates to fluid distribution and control apparatus and especially to fluid distribution and control apparatus for water softening systems adapted to effect regeneration of the system at the will and convenience of the user.

The invention further relates to fluid distribution means for a water softening system having control means located at a convenient point remote from the softening apparatus for initiating and effecting regeneration of the softener bed.

The invention still further relates to novel fluid distribution and control means for use in treating a bed of material to effect periodic regeneration thereof.

In general, the invention relates to a fluid distribution system and control means for use with water softening systems of the type employing a bed of zeolite having the property of exchanging its normal sodium base for calcium and magnesium; the principal substances dissolved in water that impart hardness thereto.

The fluid distribution unit of the present invention is of extremely compact construction and comprises six diaphragm valves arranged to be operated in pairs and all controlled simultaneously by a master pilot valve to effect normal softening service and the successive steps of the regenerating cycle, to wit, backwashing, salting and rinsing. The fluid distribution unit further comprises a built-in injector actuable by the flow of water under the control of one of said diaphragm valves for drawing brine from a brine tank during the salting step.

When the present system is in normal service, that is, when the water softener is functioning to soften water, the control knob and master pilot valve disc are in what may be termed their normal inoperative position, but the master pilot valve disc at this time is in such position and cooperates with the fluid distribution device or unit in such manner that the fluid pressure on one pair of diaphragm valves only is relieved through the pilot valve, permitting this pair of valves to open and allow an uninterrupted flow of raw and softened water through the distribution device. Suitable piping connects the distribution device with the softener, whereby raw water flows from the distribution device into the upper end of the softener, and softened water flows from the lower end of the softener back to the distribution device and, finally, from the distribution device into the service line to the point of use. It is to be understood that so long as the pressure is relieved on the pair of valves mentioned, the remaining four valves are subjected to fluid pressure and are maintained in closed position thereby.

After the system has been in operation for a period of, say, one to two weeks, and the indications are that it requires regeneration, the user need only turn the control knob through approximately half a revolution in a clockwise direction to initiate the cycle of regeneration. The rotation of the control knob rotates the master pilot valve disc and also winds the spring in the timing mechanism. The wound spring in turn stores the energy for rotating the drive shaft connected with the master pilot valve disc to impart rotation to said valve and return it slowly to its initial position. The rotation of the master pilot valve disc through a half revolution from its normal position results in the application of fluid pressure to close the above mentioned pair of diaphragm valves, which provide for normal softening operation, and to relieve the pressure on a second pair of diaphragm valves to permit the same to open. This second pair of valves is arranged in the distribution unit so as to cause the water to flow in a reverse direction therethrough to the water softener and provide a backwashing operation for flushing sediment, etc., out of the softener tank. During backwashing, the flow of water is from the distribution unit to the lower end of the softener tank, out of the upper end of the softener tank and back to the distribution unit, and finally, from the distribution unit into a drain. The above reverse circulation or backwashing operation continues for a period of time predetermined by the timing mechanism and the porting arrangement of the master pilot valve disc and may last anywhere from about five to ten minutes or more, as required by such factors as the pressure of the water, size of the softening bed, the amount of foreign matter or dirt left in the bed by the water which has been treated, etc. It will be understood that, while the second pair of diaphragm valves is open, the remaining four diaphragm valves are maintained in closed position by the application of fluid pressure thereto.

Upon completion of the backwashing step, the drive shaft of the timing mechanism will have rotated the master pilot valve disc to a position such as to relieve the pressure on, and thereby permit the opening of, still a third pair of diaphragm valves, while at the same time admitting fluid pressure to the first and second pairs of valves to maintain them in closed position.

This third pair of valves is so arranged in the fluid distribution unit as to operate the injector housed in the fluid distribution unit and thereby control the salting step, i. e., the injection of the regenerating solution into the upper end of the softening tank. During the salting step, the flow of liquid through the distribution unit is as follows: water flowing into the distribution unit is diverted into the injector, the injector is thus operated to draw brine from the brine tank, and the brine entering the distribution unit is carried along with the water to the upper end of the softening tank. The brine flows through the zeolite bed in the softening tank; discharges at the lower end of the tank, is returned to the distribution unit and is discharged from the distribution unit through the same drain beforementioned. After the charge of brine has been exhausted from the brine tank, raw water continues to flow through the system in the path described and serves to flush out the brine and any free material in the softener tank. The salting step may require from about three to ten minutes, depending upon the volume of the regenerating charge required, and the rinsing step may last for about fifteen minutes after the brine flow has ceased.

By the time that the salting and rinsing operations have been completed, the timing mechanism will have restored the master pilot valve disc to its original or normal position in which pressure fluid is relieved on the first-mentioned pair of valves, permitting these to open, and pressure fluid is applied to the second and third-mentioned pairs of valves to maintain them closed so that the system then assumes its normal function of softening water. The path of flow of water then is through the distribution valve to the upper end of the softener tank, through the softening bed, from the lower portion of the tank to the distribution device and then into the service line to the point of use, as aforedescribed.

One of the important features of the present invention is to provide a fluid distributing device which may be associated with a brine tank control mechanism in a manner to provide for salting operations. The brine tank control mechanism is fully described in my Patent 2,243,815 (Serial No. 274,288, filed May 17, 1939), issued on May 27, 1941, for "Water softening apparatus," of which this case is a division, and hence said mechanism need not be described in great detail herein.

One of the principal objects of the invention is to provide a fluid distribution device and control for water softening apparatus arranged so that said apparatus can be regenerated at the will and convenience of the user.

Another object of the invention is to provide fluid distribution and control means for a water softening apparatus which requires a minimum of attention on the part of the user.

Another object of the invention is to provide fluid distribution and control means for a water softening apparatus which does not require the presence of the user at the side thereof during the cycle of regeneration.

Another object of the invention is to provide fluid distribution and control means for a water softening system which is semi-automatic in operation, that is, requires manual operation to initiate the regenerating cycle, but is otherwise fully automatic.

Still another object of the invention is to provide a fluid distribution system and control means for water softening apparatus which eliminates the inconveniences and the expense of maintenance encountered with more complex manual and fully automatic water softening systems.

Another object of the invention is to provide, in water softening apparatus, novel control means for automatically timing the various steps in the cycle of regeneration.

Another object of the invention is to provide a fluid distribution device or unit which operates quietly without line shock, chatter or vibration.

Another object of the invention is to provide a fluid distribution device or unit and control means therefor which requires only a very small force to operate, irrespective of the pressure of the fluid flowing through said fluid distribution device or unit.

Still another object of the invention is to provide a fluid distribution device or unit of compact yet relatively simple construction for controlling the flow of water and brine to the softer tank.

A still further object of the invention is to provide control means for starting and controlling the cycle of regeneration of a water softening system from a point remote from the apparatus.

Other and further objects of the invention will be apparent from the following description taken in conjunction with the accompanying drawings, in which:

Figure 1 is a diagrammatic elevational view of a water softening apparatus embodying one form of fluid distribution and control means based upon the principles of the present invention, the brine tank being shown in cross section;

Figure 2 is a sectional view taken on the line 2—2 of Figure 1;

Figure 3 is a sectional view through the master control device and the fluid distribution device or unit, taken on the line 3—3 of Figure 1;

Figure 4 is a sectional view taken on the line 4—4 of Figure 3, showing an exterior view of the cover plate and various details of the fluid distribution device or unit;

Figure 5 is a sectional view taken on the line 5—5 of Figure 3 showing the details of the grooving and porting in the underside of the cover plate of the fluid distribution device or unit;

Figure 6 is a sectional view taken on the line 6—6 of Figure 3 showing the body portion of the fluid distribution device in elevation;

Figure 7 is a sectional view through the fluid distribution device taken on the line 7—7 of Figure 4, showing the diaphragm valves 1 and 2, which control the flow of raw water to the softener during the normal softening operation, in open position;

Figure 8 is a similar sectional view taken on the line 8—8 of Figure 4, showing the diaphragm valves 5 and 6, which control the backwashing operation, in closed position;

Figure 9 is a further similar sectional view taken on the line 9—9 of Figure 4, showing the diaphragm valves 3 and 4, which control the salting and rinsing operations, in closed position;

Figure 10 is a transverse sectional view through the fluid distribution device, taken on the line 10—10 of Figure 9;

Figure 11 is a view of the combined gasket and diaphragm employed in the present fluid distribution device and showing certain parts of the valves 1, 2, 3, 4, 5 and 6 assembled therewith;

Figure 12 is a detail elevational view of the master control device showing the control knob and its associated legend bearing plate;

Figure 12ª is an elevational view of a modified form of control including an adjustable stop for varying the duration of the "backwash" operation.

Figure 13 is a perspective view of one side of the pilot valve disc of the master control device;

Figure 14 is a sectional view through the master pilot valve disc taken on the line 14—14 of Figure 13;

Figure 15 is a perspective view of the opposite side of the master pilot valve disc and the means for rotating the same;

Figure 16 is a perspective view of the valve seat which cooperates with the master pilot valve disc, the gasket which is interposed between the end of the housing of the master control unit and the fluid distribution device, and the distribution plug of the fluid distribution device;

Figure 17 is a view of the outer face of the fluid distribution plug;

Figure 18 is an inverted plan view of the distribution plug as viewed in Figure 17;

Figure 19 is a diagrammatic view illustrating the flow through the fluid distribution device during normal softening service;

Figure 20 is a similar view showing the flow during the backwash period;

Figure 21 is another similar view showing the flow during the salting and rinsing period;

Figure 22 is a schematic view illustrating the relative position of the control knob and the ports and grooves in the master pilot valve disc and the distribution plug, respectively, during normal softening service;

Figure 23 is a similar view showing the relationship of the same parts during backwashing;

Figure 24 is another similar view showing the relative positions of the parts during the salting and rinsing period;

Figure 25 diagrammatically illustrates a still further modification of the invention in which the master control unit is located at a point remote from the softening apparatus;

Figure 26 is a diagrammatic perspective view illustrating the manner in which pressure and exhaust fluid may be conducted from the master control unit or device to the fluid distribution device; and Figure 27 is a diagrammatic view partly in section showing the details of connecting various ports in the master control device with corresponding ports in the fluid distribution device.

Referring now to the form of the invention shown in Figures 1 to 24, inclusive, and more particularly to Figure 1, the water softener is generally designated by the letter A, the brine tank by B, the fluid distribution device or unit by C, the manually operable master control device for starting the regenerating cycle by D, and the float-controlled valve and its associated linkage on the brine tank by E.

Raw water, i. e., the water to be treated, is introduced into the system through a supply pipe 11 connected to an inlet opening at one side of the fluid distribution device C. The raw water introduced by the supply pipe 11 flows through various passageways in the fluid distribution device C, as will be explained later, and is then conducted from an outlet opening of said distribution device to the softener A by piping generally indicated at 13. As is clearly shown in Figure 2, the piping 13 extends into a softener tank 14 and is preferably arranged so that the discharge therefrom is upward toward the inside of the tank head 15.

The tank 14 of the softener A contains a bed 16 of zeolite (or other water softening material). Discharge piping 17 is arranged adjacent the bottom of the tank 14 and conducts the water that has passed through the bed 16 back to the distribution device C. A portion of the pipe 17 lies within the tank 14 and is provided with a series of downwardly facing slots 17a. The softened water enters the distribution device through the piping 17 connected with an opening conveniently referred to as a return opening and passes therethrough in a manner which will also be explained hereinafter and ultimately discharges through a service opening into a service pipe 18. One end of a drain pipe 19 is connected to a waste opening in said distribution device for a purpose set forth later herein.

The brine tank B contains a bed of salt 20 and the usual layer of coarse gravel 20a. A pipe 21 extends through the salt bed 20, as shown in Figure 1, and one end 22 thereof is perforated and projects into the layer of gravel 20a. The opposite end 23 of the piping 21 is connected to a float controlled diaphragm valve generally indicated by the numeral 24. A pipe 25 connects the diaphragm valve 24 with the distribution device C.

The master control device D is best illustrated in Figure 3, and comprises a main housing 40 and a hinged cap 41 pivotally mounted at one side thereof upon the housing between ears 40a by a pin 42. The opposite side of the cap 41 is provided with a projecting tongue 43 which extends between a pair of lugs 44 depending from the housing 40. The tonnage 43 is provided with an aperture 45 located so that it extends inwardly beyond the lugs 44 when the cap is in closed position. The aperture 45 is thus adapted to receive a pin, lock or other means for maintaining the cap in closed position.

A clock mechanism generally designated 46 is mounted within the main housing 40 and is disposed between a shoulder 47 and a cover plate 48. A gasket 49 is interposed between the cover plate 48 and a flange 50 of the main housing 40. A series of screws 51 retain the cover plate 48, gasket 49 and clock mechanism 46 in assembled relation with the housing 40.

A stop pin 52 is mounted in the cover plate 48 and projects through the top plate of the clock mechanism 46, whereby rotation of the clock mechanism 46 relative to the cover plate 48 is prevented.

A control knob 54 is operatively associated with a drive shaft 55 of the clock mechanism and one end 56 of said control knob is adapted to engage the stop pin 52 in the normal inoperative position thereof (see Figures 3 and 12).

The clock mechanism 46 is conventional, and therefore need not be described in detail. It will be understood from prior statements made herein that the spring of the clock mechanism is wound by manually turning the control knob 54 clockwise for about half a revolution or until the end 56 of said control knob engages a second stop member 57. Upon release of the control knob 54, the spring will cause the control knob 54 to slowly return to its initial position; the time required being about thirty minutes. For convenience, the face of the cover plate 48 may be inscribed with suitable indicia to indicate the various functions controlled by the master valve. For example, the cover plate shown herein bears the legend "Service" adjacent the stop pin 52 (see Figure 12) to indicate the normal inoperative position of the control knob 54. The cover plate 48 further bears the legend "Backwash" adjacent the second stop pin 57, which operation occurs when the knob 54 is turned clockwise so that its end 56 is brought into engagement with said stop pin 57. Intermediate the service and backwash legends is a third legend, namely, "Salting-Rinsing," and when the end 56 of the control knob 54 is traversing this portion of the cover plate, it indicates the fact that the water softening apparatus is undergoing the operation of salting and the subsequent step of rinsing.

A driving element 60 (see Figure 3) is driven by the drive shaft 55 of the clock mechanism 46 and it in turn drives a shaft 61 through a driven element 62 suitably secured to one end of the shaft 61. The driven element 62 is provided with apertures 63 adapted to receive pins 64 carried by the driving member 60. The opposite end of the shaft 61 is rounded as shown at 61ª and is provided with a driving element 65. A master pilot valve disc 66 is arranged in substantially axial alignment with the shaft 61 and is provided, as best shown in Figure 15, with a pair of apertures 67 adapted to receive short pins 67ª carried by the driving element 65 and a through aperture 68 adapted to receive a long pin 68ª. This arrangement has the advantage that it permits the assembly of the parts in only one way. The apertures 67 and 68 are of greater diameter than the pins 67ª and 68ª to permit slight relative movement of the disc on the pins. It will, therefore, be apparent from the foregoing that as the drive shaft 55 of the clock mechanism drives the driving element 60, rotation is imparted to the pilot valve disc 66 through the driven element 62, shaft 61, and driving element 65.

The shaft 61 (see Figure 3) is packed in the housing 40 by suitable packings 69 and 70. The packing 69 surrounds the shaft 61 and is engaged by a packing washer 71 which in turn is engaged by a gland 72 threaded into the housing 40 adjacent the driven element 62. Adjustment of the gland 72 against the washer 71 compresses the packing 69 to the extent desired to form a suitable seal around the shaft 61. The packing 70 likewise surrounds the shaft 61 and is compressed between packing washers 73 and 74 by a gland member 75 threaded into the housing 40.

A compression spring 76 surrounds the shaft 61 and one end thereof engages the gland 75. The opposite end of said spring engages a seating washer 77 carried by the shaft 61. The washer 77 is arranged to abut the driving element 65, and, inasmuch as the spring 76 is a compression spring, it tends to urge the driving member 65 toward the pilot valve 66. The spring 76 urges the rounded end 61ª of the shaft against the valve disc 66 to hold the same against its seat at all times, as will appear more fully hereinafter.

The master pilot valve disc 66 has opposite flat faces 80 and 81 (see Figures 13, 14 and 15). A plurality of supply ports 82, 83, 84 and 85 extend transversely through the body of the pilot valve and are connected on the side 81 by a pressure fluid supply groove generally indicated by the numeral 86. In some instances it may be desirable to omit ports 83 and 84, inasmuch as the ports 82 and 85 will supply the necessary pressure fluid to the groove 86.

The master pilot valve disc 66 is also provided with a U-shaped exhaust passageway 87 (see Figure 14). One leg 88 of the U-port 87 is arranged axially of the pilot valve disc and opens into the side 81 thereof. The other leg 89 of said U-shaped exhaust passageway is spaced radially from the axial passageway 88 and also opens onto the side 81 of said pilot valve disc. An arcuate drain groove 90 merges with the opening defined by the leg 89 and extends circumferentially in the side 81. It will be noted that the supply groove 86 and the drain groove 90 are formed concentric with the axial opening 88 and that the supply ports 82, 83, 84, 85, the exhaust port 9 and the terminal of the drain groove 90 are spaced approximately 60° apart. This spacing, however, is not critical and may be varied as desired, within limits of course.

The side 81 of the pilot valve 66 is adapted to seat against a flat surface 95 of a valve seat 96 (see Figure 3). The valve seat 96 is received in a recess 97 formed in one end of the housing 40. The valve seat 95 is secured to the housing 40 by a pair of screws 98 adapted to extend through openings 98ª (see Figure 16). The valve seat 95 is provided with an axial port 99 adapted to register with the axial opening 88 in the pilot valve disc 66. The valve seat 95 is also provided with a series of transverse openings 100, 101 and 102, respectively, which are spaced the same distance from the axis of the valve seat 95 as the supply and drain grooves 86 and 90 of the pilot valve. A pair of dowel pins 98ᵇ are provided to assure accurate assembly of the seat with the housing.

A gasket 105 (see Figures 3, 7 and 16) is interposed between the end of the housing 40 and a boss 106 formed on the cover plate P of the fluid distribution device C. A plurality of screws K clamp said gasket between the housing 40 and the boss 106, as shown in Figure 7. The gasket 105 is provided with an axial opening 107 aligned with the opening 99 in the valve seat 95 and the opening 88 in the valve disc 66. The gasket 105 is also provided with transverse openings 108, 109 and 110 adapted to respectively register with the transverse openings 100, 101 and 102 in the valve seat 95. Thus, it will be clear that the aligned openings in the valve seat 95 and the gasket 105 permit flow of supply or exhaust fluid through both of these elements simultaneously.

The fluid distribution unit or device C comprises a body F, a cover plate P and a combined gasket and diaphragm G interposed between said body and cover plate. The diaphragm is clamped between the body F and cover plate P in fluid tight relation by a series of bolts H which extend through the cover plate and gasket into the body of the distribution valve, as best illustrated in Figure 3.

The housing F of the distribution device C contains six diaphragm valves 1, 2, 3, 4, 5 and 6, respectively. These valves are indicated by dotted lines in Figure 4 and by dot-and-dash lines in Figures 6 and 10, respectively. All six valves are of identical construction, and it will suffice for the purpose of the present disclosure to describe only one in detail. For this purpose it will be convenient to refer to Figure 7 which shows the valves in cross section.

Each of the valves 1, 2, 3, 4, 5 and 6 consists of a guide member 111 having a plurality of legs 112 circumferentially spaced from each other. An annular packing washer 113 engages one side of the guide member 111 and is received in a cup 114. The upper external surface of the cup 114 is preferably made convex, as indicated at 115. The cup 114, washer 113 and the guide 111 are maintained in assembled relation by a bolt 116 having an enlarged head 116a. The bolt 116 has a threaded shank 117 received in a threaded opening 118 in the guide member 111. A diaphragm member G is clamped between the convex side 115 of the cup 114 and the underside of the head 116a. In this manner, the valve is maintained in assembled relation with the diaphragm. The diaphragm G and washer 113 may be compressed to the extent desired by threading the guide 111 onto the shank 117 of the bolt 116. A prick punch may be used to peen a portion of the thread of the shank onto the underside of the guide to prevent inadvertent disassembly.

Fluid under pressure for operating the valves 1, 2, 3, 4, 5 and 6 is supplied by the master pilot valve 66 to a fluid distribution plug X (see Figure 3). The plug X is preferably shrunk or press-fitted into a recess 120 in the boss 106 formed on the cover plate P of the fluid distribution device C. The plug X is shown in detail in Figures 16, 17 and 18, and comprises an outer cylindrical portion 121 and an inner cylindrical portion 122 of reduced diameter, whereby a shoulder 123 is formed between the portions 121 and 122. The shoulder 123 is adapted to engage a complementary shoulder 124 formed in the recess 120. The plug X may be inserted into the cover plate P in any desired manner so long as a fluid-tight fit is formed between the outer periphery of said plug and the walls of the recess 120.

The plug X is provided with an axial opening 125 which communicates with a radial exhaust passage 126 extending through the annular portion 121 of the plug X. The axial opening 125 and the radial passage 126 serve as conduits permitting exhausting of pressure fluid from the distribution device C in a manner which will be explained hereinafter.

The fluid distribution plug X is also provided with a transverse passageway 127 which communicates with a longitudinal port 128 and longitudinal passageways 129 and 130. The port 128, the transverse passageway 127 and the longitudinal passageways 129 and 130 serve to supply and exhaust pressure fluid from a pair of diaphragm valves 1 and 2 providing normal softening operation in a manner which will be fully set out hereinafter.

The plug X is further provided with a second longitudinal port 131, a transverse passageway 132 and longitudinal passageways 133 and 134. These ports and passageways serve to supply and exhaust pressure fluid from another pair of diaphragm valves 3 and 4 providing the salting and rinsing in a manner which will be made apparent hereinafter.

The plug X is still further provided with a third longitudinal port 135, a transverse passageway 136 and longitudinal ports 137 and 138. These passageways and ports serve to supply and exhaust pressure fluid from still another pair of diaphragm valves 5 and 6 providing backwash in a manner which will also be made apparent hereinafter.

It will be noted from Figure 16 that the ports 128, 131, and 135 in the plug X are aligned with ports 100, 102, and 101, respectively, of the valve seat 95. It will also be understood that the outer end of the radial exhaust passageway 126 and the respective ends of the transverse passageways 127, 132 and 136 are closed by the walls of the recess 120.

The plug X is proportioned so that its inner face 139 is substantially flush with the inner face of the cover plate P and its outer face 140 is substantially flush with the surface of the boss 106, as is also clearly shown in Figure 3.

The axial port 125 extends inwardly from the face 140 and communicates with the exhaust passage 126 in order that spent pressure fluid may be conducted from the axial center of the plug outwardly to its periphery. In order to facilitate the discharge of fluid from the passageway 126, the boss 106 is provided with an aligned passageway 141 (see Figure 3). The passageway 141 in turn communicates with a transverse passageway 142 in the cover plate P. The gasket 105 is provided with an opening 143 aligned with the transverse passageway 142 and the combined gasket and diaphragm G is provided with a similar opening 144. The housing 40 is provided with a passageway 145 aligned with the passageway 142 and is further provided with a radial passageway 146 intersecting with the passageway 145 at the point 147. A screw 148 is threaded into the outer end of the passageway 146 to plug the same.

The body F of distribution device C is provided with a threaded opening 149 (see Figure 3) communicating with the passageways 142, 143, 144 and 145, and a drain pipe 150 is threaded into the opening 149, whereby any fluid which has leaked past the packing 70 will be free to drain from the control unit C.

Referring to Figure 5, the inner face 139 of the plug X is provided with a series of relatively shallow grooves communicating with a series of cooperating grooves formed in the inner face of the cover plate P of the fluid distribution device whereby fluid may be introduced into or exhausted from the pressure chambers of the diaphragm valves 1 to 6 inclusive. More specifically, the plug X is provided with a shallow groove 129' extending from the longitudinal passageway 129 outwardly to the periphery of the plug. The inner face of the cover plate P is provided with an irregular shaped groove 1a which is in communication at one end thereof with the shallow groove 129'. A passageway 1b connects the opposite ends of the groove 1a with a pressure chamber 1c above the diaphragm valve 1.

The inner face 139 of the fluid distribution plug X is also provided with a second shallow groove 130' which extends from the longitudinal passageway 130 outwardly to the periphery of the plug X. One end of the groove 2a formed in the inner face of the cover plate P communicates with the shallow groove 130', and a passageway 2b connects the opposite end of said groove with a pressure chamber 2c positioned above the diaphragm valve 2.

The plug X is further provided with a shallow groove 133' which extends from the longitudinal passageway 133 outwardly to the periphery of the plug X. A groove 3a formed in the inner face of the cover plate P is connected at one end with the shallow groove 133' and its opposite end is connected by a passageway 3b with a pressure chamber 3c located above the diaphragm valve 3.

The plug X is still further provided on its inner face with a shallow groove 134' extending from the longitudinal passageway 134 outwardly to the periphery of said plug. The inner face of the cover plate P is provided with still another groove 4a connected at one end with the shallow groove 134' and connected at its other end by a passageway 4ᵇ with a pressure chamber 4ᶜ above the diaphragm valve 4.

The inner face 139 of the plug X has another shallow groove 137' extending outwardly from the longitudinal passageway 137 to the periphery of the plug X. A groove 5ᵃ formed in the inner face of the cover plate P is connected at one end with said shallow groove 137' and its opposite end is connected by a passageway 5ᵇ with a pressure chamber 5ᶜ above the diaphragm valve 5.

The inner face 139 of the plug X is provided with still another shallow groove 138' extending outwardly from the longitudinal passageway 138. A groove 6ᵃ formed in the inner face of the cover plate P is connected at one end with said shallow groove 138' and its opposite end is connected by a passageway 6ᵇ with a pressure chamber 6ᶜ above the diaphragm valve 6.

The various passageways, valve seats, etc. in the body F of the fluid distribution device C are about to be described and it will therefore be convenient to refer to Figures 5 to 10.

As has been stated hereinbefore, raw water is introduced into the distribution device C through the supply pipe 11. This water flows from the pipe 11 into a passageway 160 defined by walls 161 arranged below the seats 5ˢ, 3ˢ and 1ˢ for the valves 5, 3 and 1, respectively. This passageway terminates beneath valve seat 1ˢ at the partition indicated by 162 (Figure 10).

The raw water normally discharges from the distribution device through the pipe 13. This pipe communicates with a passageway 163 shown adjacent to the passageway 160. However, the passageway 163 is separated from the passageway 160 by the wall 161 and the partition 162. The passageway 163 is defined by walls 164 and terminates at the partition 165 below the seat 6ˢ of the diaphragm valve 6 (see Figure 10).

The return of water to the distribution device C from the water softener normally takes place through the pipe 17 already referred to. Water entering the distribution device from the pipe 17 discharges into a passageway 166 defined by walls 167 and extending beneath the seats 2ˢ and 4ˢ of the valves 2 and 4, respectively. The passageway 166 terminates at one end in a partition 168 (see Figure 10) disposed below the seat 4ˢ of diaphragm valve 4, and terminates at its opposite end in a partition 169 adjacent the valve seat 5ˢ of the diaphragm valve 5. Thus, the passageways 160 and 166 are separated by the partition 169 formed by adjacent portions of walls 161 and 167.

Referring to Figures 6, 7 and 10, and especially to Figure 7, the distribution device C is provided with an opening 175 between the seat 1ˢ of the valve 1 and an inwardly extending flange 176 on the body F disposed adjacent to the gasket G. Hence, when valve 1 is open and valves 5, 3, and 6 are closed, raw water will flow through the passageway 160, through the seat 1ˢ and opening 175 into the passageway 163, and thence into the pipe 13 leading to the softener tank 14. An opening similar to the opening 175 is provided above the seat 2ˢ of valve 2. This opening is indicated at 177 and communicates with a chamber 178 (see Figure 10) adjacent the opening for the service pipe 18. The valve 2 is open at the same time as valve 1 (as shown in Figure 7) and the softened water entering the distribution valve through the pipe 17 then flows into the passageway 166, through the valve seat 2ˢ, opening 177 into chamber 178, and thence through service pipe 18 to the point of use. The flow of water through the distribution device when valves 1 and 2 are open and valves 3, 4, 5 and 6 are closed is diagrammatically shown in Figure 19. The criss-cross hatching here indicates the valves that are closed during normal softening operation.

During the backwashing step, valves 5 and 6 are open and valves 1, 2, 3 and 4 are all closed, as is diagrammatically shown in Figure 20. The flow of raw water to the softener is reversed at this time in order that the water will flow upwardly through the bed in the softener tank and flush it out. Accordingly, raw water introduced through the pipe 11 enters the passageway 160, but since valves 1 and 3 are closed and valve 5 is open, the water must leave through the seat 5ˢ of the valve 5. In order to provide egress for the water to pipe 17, an opening 179 somewhat similar to the opening 175 is provided immediately above the partition 169, or in other words, above the seat 5ˢ of the valve 5. Water then flows through the opening 179 into the passageway 166, beneath valve 2 and into pipe 17. Water is discharged from the pipe 17 through the slots 17ᵃ at the lower portion of the softener tank 14. The water then flows upwardly through the softener bed 16 and out of the tank through the pipe 13. the pipe 13 discharges into the passageway 163 which, as has been previously described, extends to a point beneath the valve 6. The valve 6, as has also been stated, is open during the backwash period, therefore water from the passageway 163 passes through the seat 6ˢ of the valve 6. An opening 180 similar to the opening 179 is provided above the seat 6ˢ and above the partition 165 to permit flow into a chamber 181. The chamber 181 lies between the partitions 165 and 168. Water entering this chamber is required to leave the distribution device through the drain pipe 19.

In order to introduce brine into the system to regenerate the softening bed 16, the distribution device C is provided with an injector generally designated by the numeral 185 (see Figure 10) mounted in a housing 186 formed integral with the body F. The injector comprises a nozzle 187 threadedly mounted in an opening 188 in the housing 186. The nozzle 187 is provided with a tapered orifice 189 arranged so that its smaller and discharges into a chamber 190. The opposite or larger end of said orifice communicates with a chamber 191. The chamber 191 in turn is associated with an opening 192 in the body F (see Figure 9) arranged above the seat 3ˢ of the valve 3. Thus, it will be apparent that when the valve 3 is open and valves 1 and 5 are closed, raw water from the passage 160 will flow through the seat 3ˢ of the valve 3, through the opening 192, and into the chamber 191.

A screen 193 (Figure 10) is arranged in the chamber 191 substantially concentric with the nozzle 187. One end of the screen is suitably secured to a boss 194 formed on the nozzle 187 and the opposite end of the screen is received in a recess 195 formed in a plug 196. The plug 196 is threaded into an opening 197 formed in the housing 186. A gasket 198 is disposed between the housing 186 and the plug 196 to form a seal.

The injector 185 further includes a second nozzle 200 threadedly mounted in an opening 201 formed in a partition 202 located between the chamber 190 and the passageway 163. The nozzle 200 is provided with an orifice 203 which may be of uniform diameter and arranged in alignment with the tapered orifice 189 of the nozzle 187.

In assembling the injector in the housing 186, it will be understood that the nozzle 200 is first threaded into the opening 201 by means of a suitable wrench, and that the nozzle 187 is similarly mounted. The screen 193 is preferably preassembled with the plug 196 and the gasket 198 is positioned on the plug 196. The plug is then threaded into the opening 197. This arrangement facilitates assembly and provides for ready removal of the screen for cleaning.

The chamber 190, which is disposed between the nozzles 187 and 200, is provided with an inlet opening 26 into which the brine pipe 25 is threaded.

During the period of regeneration when brine is being circulated through the softener tank 14, the valves 3 and 4 are open and the valves 1, 2, 5 and 6 are all closed, as is diagrammatically shown in Figure 21. Raw water supplied by the pipe 11 then enters the passageway 160 and flows through the seat 3$^s$ of open valve 3, through opening 192, into chamber 191, through tapered orifice 189, into chamber 190 and then through the plain orifice 203. The effect of this flow is to create a partial vacuum in the chamber 190 and pipe 25. The vacuum thus induced creates a suction permitting opening of the brine control valve 24 in a manner which is fully described in my patent, supra. Upon opening of the valve 24, the injector draws the brine charge from the brine tank B and both brine and raw water are discharged from the nozzle 200 into the passageway 163. The mixture is then conducted by the pipe 13 into the top of the softener tank 14 so that reaction with and regeneration of the bed 16 occurs by the down-flow of the brine therethrough. The used brine is discharged from the softener tank 14 into the pipe 17 which returns it to the distribution device for flow into the chamber 166. An opening 210 above the partition 168 similar to the opening 180 is provided in the body F, whereby the brine can flow from the passage 166, through the seat 4$^s$ of the valve 4, into the passage 181 and finally into the drain pipe 19. It will be understood that the valve 2 is closed during the brining operation and that, therefore, no brine can flow from the passage 166 into the chamber 178 and the service pipe 18.

Flow in the above manner is maintained until the complete charge of brine has been withdrawn from the brine tank B and circulated through the system, whereupon the brine flow will cease, but raw water will continue to flow through the system to flush out the softener tank, as explained in my patent, supra.

The body F of the fluid distribution device C is provided with a rib 211 disposed generally between the valves 1 and 3, as indicated in Figures 3 and 10. A passageway 212 is drilled or otherwise formed in the rib 211 to establish communication between the passageway 160 and the front wall of the distribution device C. Inasmuch as the passageway 160 is always under line pressure, a corresponding pressure will obviously exist in the passageway 212.

Referring to Figure 3, it will be seen that the gasket G is provided with an opening 213 in registration with one end of the passageway 212, and further, that the boss 106 of the cover plate P is provided with a horizontal passageway 214. The gasket 105 is provided with a passageway 215 and the housing 40 is provided with a passageway 216; the passageways 212, 213, 214, 215 and 216 all being in communication, whereby fluid under pressure from passageway 160 may enter a chamber 217 formed in said housing. A strainer plug 218 is threaded into the chamber 217 as indicated at 219. A gasket 218$^a$ is positioned below the head of the plug to form a water-tight seal.

The strainer plug 218 comprises a hollow stem 218$^b$ having a series of spaced apart annular flanges 220, 221 and 222 with openings 223 between the flanges communicating with a central opening 224 in the stem. A screen 225 surrounds the flanges 220, 221 and 222 and serves to screen the openings 223. Thus, pressure fluid must pass through the screen 225 before it can leave the chamber 217 and enter the hollow stem 218$^b$. It will be noted at this point that the lower portion of the stem beyond the flange 222 is of greater axial length than the threaded portion 219 of the plug and extends into an opening 226 in the housing 40. Thus, the opening 226 will be obstructed by the extremity of the stem 218$^b$ until after the threaded portion 219 has been completely backed out of its opening; the object of this arrangement is to permit any water contained in, or flowing into, the chamber 217 to flush foreign matter out of said chamber during the removal of the plug rather than carry it into the opening 226.

The opening 226 in the housing 40 communicates with the pressure chamber 66$^a$ in which the pilot valve 66 is received. This chamber is constantly filled with fluid under pressure for actuating the various diaphragm valves 1 to 6, inclusive, of the distribution device C.

The valve 24 includes a pilot actuating shaft 302, which carries a pilot disc (not shown herein, but fully disclosed in my patent, supra) for controlling the operation thereof. The linkage E associated with the valve 24 comprises an arm 321 fixedly connected at one end thereof to the pilot shaft 302 and pivotally connected at its opposite end to a hollow rod 350. A bracket 325 is secured to the valve 24 and provides a fulcrum for a lever 342, one arm of which is pivotally connected with the rod 350 and the other arm of which is threaded and carries an adjustable counterweight 347. A float 354 is slidably mounted upon the rod 350 btween stops or collars 353 and 353$^a$ which determine the maximum high and low levels, respectively, of the brine in brine tank B.

The counterweight 347 and the associated arm of the lever 342 are of a combined mass sufficient to counterbalance the dead weight of the valve operating linkage comprising the actuating arm 321, the other arm of the lever 342 and the hollow rod 350. The counterweight 347 is adjustable lengthwise of the arm 343, whereby the linkage may be nicely counterbalanced. The weight of the ball float 354 is sufficient to cause the lever 342 to pivot upon its supporting stud and to cause the arm 321 to rotate the drive shaft 302 of the pilot valve when the weight of said float is imposed upon the collar 353$^a$. Such imposition occurs when the level in the brine tank is being lowered and the float is gradually descending on the rod 350 with the liquid level and engages the collar 353$^a$. Upon further lowering of the liquid level, the weight of the float carries the rod 350 bodily downward and thereby moves the arm 321 to an angular position in which its center line is on a radii approximately 60° below the position of said arm shown in Fig. 1. When the liquid level is rising in the brine tank, instead of falling, the float 354 will rise on the rod 350 without affecting the position of the arm 321 and lever 342 until it engages the collar 353, whereupon it will carry the rod 350 bodily upward and thereby move the arm 321 and lever 342 to the angular position shown in Fig. 1.

Let it be assumed that the cycle of regeneration has reached the salting stage and that the brine is at the proper level in the brine tank, the arm 321 will then be in its upper angular position as indicated in Figure 1. Any suction induced in the pipe 25 at this time by the injector 185 will tend to create a vacuum in the valve 24. This condition, as explained in my patent, supra, enables the higher or approximately atmospheric pressure on the fluid in the tank B and the pipe 21 to effect opening of the valve 24 to permit the injector 185 to withdraw brine from the brine tank B through the pipe 21, valve 24 and pipe 25 into the chamber 190 of the fluid distribution device C. The flow of brine from the chamber 190 through the distribution device to the softener tank 14 already has been described in connection with Figure 21, and repetition here would be superfluous.

So long as the injector 185 continues to draw brine from the brine tank, the brine level will be lowered and the float 354 will descend with said level until it engages the collar 353ª, and then arm 321 and lever 342 will be angularly rotated counterclockwise to actuate the pilot shaft 302, as explained in my patent, supra, to close the valve and cut off the supply of brine to the injector.

The timing of the salt-rinse step is such that the flow of water through the fluid distribution device C and injector will continue for a considerable period of time after salt injection has ceased in order to rinse or flush out the brine from the softener bed 16. In other words, the brine flow continues for from three to about ten minutes and the rinse water flows for about fifteen minutes thereafter.

After rinsing is completed, the master pilot valve disc 66 will have reached a position permitting resumption of the normal softening operation, that is, valves 1 and 2 will again be open and valves 3, 4, 5 and 6 will be closed. The closing of valve 3 cuts off flow to the injector and the closing of valve 4 shuts off flow through drain pipe 19. However, the opening of valve 1 allows water to flow into the softener tank and a back pressure is set up in the pipe line 13 which causes a portion of the water entering the distribution device to be diverted from the passage 163 into the orifice 203 and chamber 190 of the distribution device C, and finally into pipe 25. The water flowing into the pipe 25, of course, will build up pressure in the diaphragm chamber in the valve 24, as described in my patent, supra, and when this pressure exceeds atmospheric, the valve will open and the water will readily pass through said valve, enter the pipe 21, and discharge therefrom into the lower portion of the brine tank B. Upon continued discharge, the level in the brine tank will gradually rise and the float 354 will be carried upwardly until it engages the collar 353 on the rod 350 and return the arm 321 and the lever 342 to their original angular position. Such movement of the arm 321 will necessarily rotate the pilot shaft 302 and the brine pilot valve (not shown) and return the same to their original position.

It will be apparent from the foregoing and from my patent, supra, that the fluid distribution device C and injector 185 are so associated with the valve 24 on the brine tank B that the brine is automatically withdrawn and fresh water is introduced into the brine tank to serve as a subsequent charge. This same automatic draining and refilling occurs each time that the softener bed is regenerated. It will also be apparent that the volume of the brine charge may be varied by adjusting the position of the collar 353 and 353ª on the rod 350.

The distribution of fluid through the system to effect regeneration and the automatic operation of the brine tank having been described, consideration will now be given to the details of operation of the three pairs of valves 1—2, 3—4, and 5—6, respectively, which affect the various steps of "service," "backwash," and "salting-rinsing." For this purpose, it will be convenient to first refer to Figure 22, which diagrammatically illustrates the relative positions of the control knob 54, the ports and grooves of the master pilot valve 66 and the principal ports of the distribution plug X. In this view, as well as in Figures 23 and 24, the various grooves and ports have been shown out of proportion in order to better illustrate registration and overlapping thereof.

It will be recalled that the master pilot valve disc 66 is subjected to constant fluid pressure in the chamber 66ª of the master control device D. Hence, fluid under pressure is always present in the pressure groove 86 of the master control valve 66 being admitted thereto by the through-ports 82, 83, 84 and 85.

The exhaust groove 90 of the master pilot valve normally registers with the port 128 of the distribution plug X, and the leg 89 of the U-shaped passageway 87 is in alignment with the port 128. The other leg 88 of said U-shaped passageway is continuously in registration with the axial port 125 of the distribution plug X. Inasmuch as the passageway 87 controls the exhaust of fluid from the valves 1 to 6 and specifically from the pressure chambers of diaphragm valves 1 and 2, when the passage 89 and port 128 are in alignment as shown in Figure 22, these valves will be open.

Upon reference to Figures 3, 4, 5, 7 and 10, it will be seen that pressure fluid from valve chamber 1ᶜ will be exhausted through passage 1ᵇ, and groove 1ª in the cover plate P; shallow groove 129', longitudinal passage 129, transverse passage 127 and port 128 in plug X; passage 108 in gasket 105; port 110 in valve seat 95; U-shaped passageway 87 in the master pilot valve 66; exhaust port 99 in valve seat 95; passage 107 in gasket 105; exhaust port 125 and passage 126 in plug X; passages 141 and 142 in cover plate P; opening 144 in gasket G; and finally through drain pipe 150. Thus, the valve 1 can obviously be opened by the pressure of the raw water in passage 160 of the body F upon exhaust of pressure fluid from valve chamber 1ᶜ.

Fluid under pressure is simultaneously exhausted from the chamber 2ᶜ of valve 2 by flowing through the passageway 2ᵇ and groove 2ª in the cover plate P; shallow groove 130', longitudinal passageway 130, transverse passageway 127 and port 128 in the plug X. The flow from port 128 is in the manner just described in connection with the exhausting of valve chamber 1ᶜ. Accordingly, the valve 2 will be opened by the pressure of the softened water in the passage 166 of the body F.

The pressure groove 86 of the master pilot valve 66 also normally registers with the ports 131 and 135 in the distribution plug X. The passages 85 and 83 are in direct alignment with the ports 131 and 135, respectively, as shown in Figure 22, and therefore, pressure fluid may simultaneously flow through the passages 85 and 83, respectively, of the pilot valve into said ports. The port 131 is in communication with the pressure chambers of the pair of valves 3 and 4; and the port 135 is in communication with the pressure chambers of another pair of valves 5 and 6. Application of pressure fluid to ports 131 and 135 maintains valves 3, 4, 5 and 6 closed while valves 1 and 2 are open.

The flow to valve 3 is as follows: Pressure fluid passing through passage 85 and pressure groove 86 (see Figure 9) flows through the opening 102 in the valve seat 95; opening 110 in the gasket 105; port 131, transverse passage 132, longitudinal passage 133 and shallow groove 133' in the plug X; and groove 3$^a$ and passage 3$^b$ in the cover plate P to the valve chamber 3$^c$. Pressure fluid is distributed from the transverse passage 132 to the valve 4 as follows: longitudinal passage 134 and shallow groove 134' in the plug X; groove 4$^a$ and passageway 4$^b$ in the cover plate P, and thence into the pressure chamber 4$^c$ of the valve 4.

The total pressure on the diaphragm G in chamber 3$^c$ exceeds that in passage 160 acting upon the underside of the valve guide 11 and valve 3 is thus maintained closed. Similarly, valve 4 is maintained closed by applying to the diaphragm a total pressure exceeding that in passage 166.

The application of pressure fluid to the third pair of valves 5—6 to maintain the same closed occurs as follows: pressure fluid from the passage 83 and the pressure groove 86 of the master pilot valve 66 passes through aperture 101 in the valve seat 95; passage 109 in the gasket 105; port 135, transverse passage 136, longitudinal passageway 137, and shallow groove 137' in the plug X; groove 5$^a$ and passage 5$^b$, formed in the underside of the cover plate P, to valve chamber 5$^c$. Pressure fluid flows to pressure chamber 6$^c$ of the valve 6, from the passage 136 to longitudinal passage 138 and shallow groove 138' in plug X; groove 6$^a$ and passage 6$^b$ in the cover plate P and thence into said valve chamber 6$^c$.

From the foregoing it will be apparent that during normal softening "service," a first pair of diaphragm valves 1 and 2 has the pressure thereon relieved so that the same can open; a second pair of diaphragm valves 3 and 4, and a third pair of diaphragm valves 5 and 6 are subjected to fluid pressure and are thereby maintained closed. The flow through the distribution device C in accordance with the above is schematically shown in Figure 19.

In order to initiate regeneration of the softening bed, the control knob 54 is turned clockwise approximately half a revolution. The turning of the knob 54 rotates the master pilot valve 66 so that the grooves and ports thereof assume the position relative to the distribution plug X shown in Figure 23, whereby to initiate the "backwash." It will be seen upon reference to this figure that the exhaust groove 90 is in registration with the passageway 135 of the distribution plug X, and it will be recalled that said passageway communicates with the chambers 5$^c$ and 6$^c$ of the valves 5 and 6. Hence, pressure fluid from these valve chambers will be exhausted through the passageways already described and said valves will be permitted to open. The opening of the valves 5 and 6 permits backwash flow through the distribution device C in the manner diagrammatically indicated in Figure 20. It will be further noted from Figure 23 that the pressure groove 86 is in registration with the ports 128 and 131 controlling the flow of pressure fluid to valves 1—2 and 3—4, respectively. Hence, the valves 1, 2, 3 and 4 will all be simultaneously maintained in closed position by the admission of pressure fluid to their respective pressure chambers through the passageways already described.

The duration of the backwashing period is predetermined by the timing mechanism and the location of the ports in the master pilot valve disc and distribution plug X. Accordingly, the backwashing step may be timed to last for a period of about five to ten minutes or less, as conditions require. However, this period may be varied by the installer to suit the water conditions on a particular job by locating the pin 57 to provide a shorter backwash period. To this end an adjustable stop may be provided as shown in Figure 12$^a$. Here a slidable plate 57$^a$ is adjustably held in position by a screw 57$^b$ which extends through an elongated slot 57$^c$ in said plate. A projection 57$^d$ is carried by the plate and is adapted to be engaged by a control knob 54$^a$ to limit its movement clockwise. Any suitable graduations may be provided upon the plate 57$^a$.

The relative positions of the ports and grooves of the master pilot valve 66 and the distribution plug X to effect "salting-rinsing" is diagrammatically shown in Figure 24. Here, the exhaust groove 90 is in registration with the port 131 of the distribution plug. This port communicates with the pressure chambers 3$^c$ and 4$^c$ of valves 3 and 4 and when said port is open to exhaust, these valves are permitted to open. It will be further noted that the pressure groove 86 is in registration with the ports 128 and 135 of the distribution plug and that therefore pressure fluid is admitted into said ports. The port 128 communicates with chambers 1$^c$ and 2$^c$ of valves 1 and 2 and these valves will now be closed. The port 135 communicates with chambers 5$^c$ and 6$^c$ of valves 5 and 6 and these valves will also be closed. The flow through the distribution device when the valves 3 and 4 are open and the valves 1, 2, 5 and 6 are closed is diagrammatically illustrated in Figure 21.

The timing of the regeneration cycle may be as follows: backwashing may require five to ten minutes or less; brine flow may last for from three to ten minutes, and rinsing up to fifteen minutes or more; therefore, all told, the cycle of regeneration will require about thirty minutes.

Quiet operation of the various valves 1, 2, 3, 4, 5 and 6 in the fluid distribution device is facilitated by locating the passageways 1$^b$, 2$^b$, 3$^b$, 4$^b$, 5$^b$ and 6$^b$, respectively, at a point in the upper portion of the associated pressure chambers 1$^c$, 2$^c$, etc., as shown in Figure 4. Such location prevents chattering, etc., by precluding the trapping of air in said chambers.

All of the parts of the foregoing apparatus which are subjected to contact with water or brine are preferably made of corrosion-resistant materials.

A further modification of the invention is illustrated in Figures 25, 26 and 27, wherein an arrangement is diagrammatically shown for manually controlling the regenerating cycle of the softener from a distance remote from the softening apparatus itself. When the softening apparatus is employed for domestic use, the master control mechanism D may be located in the kitchen upon a panel 465 as shown in Figure 25. When the softening apparatus is employed in a power plant or other establishment the control unit may be mounted upon a main control panel or other convenient location.

Remote control of the softening apparatus, according to the present invention, is obtained by forming the master control apparatus D as a separate unit and installing it at any point desired. Such control is then connected by suitable tubing with the fluid distribution device C; the tubing being arranged so as to apply or exhaust pressure fluid to the diaphragm valves 1, 2, 3, 4, 5 and 6 to actuate these valves in the same sequence described hereinbefore.

Figure 26 diagrammatically illustrates in perspective the various tube connections from the control unit to the fluid distribution device. Figure 27 diagrammatically indicates with more particularity the manner of connecting certain of the passageways in the master control device with their cooperating passageways in the distribution device.

In effecting remote control, one end of the master control housing 40 may be closed by a gasket 500 and a cover plate 501 secured by screws or other means to the housing 40. The gasket 500 and cover plate 501 are provided with passageways registering with the openings in the pilot valve seat 95 and with the pressure inlet opening 216 in the housing 40.

Referring to Figure 27, the gasket 500 is provided with a passageway 216ª and the cover plate 501 is provided with an opening 216ᵇ in registration with said passageway. A tube 216ᶜ serves as a conduit for conducting pressure fluid from the passageway 214 in the boss 106 of the cover plate P of the distribution device. In order to adapt the cover plate P for remote control, a gasket 503 and a plate 504 are secured to the boss 106. The gasket is provided with an opening 216ᵈ and the plate 504 is provided with an aligned opening 216ᵉ. One end of the tube 216ᶜ is received in the opening 216ᵇ and its opposite end is received in the opening 216ᵉ. It will be understood, however, that fluid pressure need not necessarily be taken from the fluid distribution device C and that, if desired, the same may be derived from a source of supply more convenient to the control unit D. In such case the tube 216ᶜ will be connected with such source and not with the plate 504. The openings 216ᵈ and 216ᵉ are then unnecessary and are omitted.

The axial opening 88 in the master pilot valve disc 66, and which opening is aligned with the opening 99 in the valve seat, registers with an opening 99ª in the gasket 500 and with an opening 99ᵇ in the cover plate 501. A tube 99ᶜ is secured in the plate 501 in registration with the opening 99ᵇ. The opposite end of the tube 99ᶜ registers with an opening 99ᵈ in the gasket 503 and an opening 99ᵉ in the cover plate 504. The openings 99ᵈ and 99ᵉ in turn register with the axial exhaust opening 125 in the plug X. The opening 125 communicates with the passage 126, which merges into the passage 141 in the boss 106, and the passageway 142. It will be recalled that the passageway 142 communicates with the drain pipe 150. Thus, it will be clear that fluid exhausted by the pilot valve disc 66 will be conducted through the tube 99ᶜ to the plug X in the fluid distribution device C and thence into the drain pipe 150. Here again, the tube connection with the plate 504 may be omitted, if desired, and the fluid drained at a point adjacent to the control unit.

In a similar manner, the port 100 in the valve seat 95 is placed in communication with the port 128 in the plug X by a tube 100ᶜ extending from an opening 100ᵇ in the cover plate 501 to an opening 100ᵉ in the cover plate 504; a tube 101ᶜ connects an opening 101ᵇ in the cover plate 501 (aligned with opening 101 in valve seat 95) with an opening 101ᵉ in the cover plate 504 (aligned with port 135 in the distribution plug); and a tube 102ᶜ connects an opening 102ᵇ in the cover plate 501 (aligned with opening 102 in valve seat 95) with an opening 102ᵉ in the cover plate 504 (aligned with opening 131 in the distribution plug).

The packing leakage port 145 of the housing 40 may be conveniently connected with the exhaust tube 99ᶜ by a short tube 145ᶜ as shown in Figures 26 and 27, or the same may be connected with any suitable drain.

It will be manifest from the foregoing that the master pilot valve 66 supplies fluid to the ports in the plug X through the various tubes 99ᶜ, 100ᶜ, 101ᶜ and 102ᶜ in a manner similar to that when the parts are arranged as shown in Figure 3; but the use of the tubes provides the additional convenience of enabling the disposition of the master control valve at a point remote from the softening apparatus itself, as diagrammatically illustrated in Figure 27.

The term "fluid distribution unit," wherever such term is specifically employed in any of the claims herein, is intended in such claims to embrace a structure wherein a plurality of valves is contained in a body or housing, as contradistinguished from an arrangement such as disclosed, for example, in Pick Patent No. 2,076,321, wherein the several separate valves are scattered and interconnected by an elaborate pipe system.

While the invention has been described and illustrated in several forms, the same may be embodied in other arrangements without departing materially from the spirit thereof or the scope of the appended claims.

I claim:

1. A fluid distribution device comprising, a body; a cover plate, a plurality of diaphragm valves in said body; a pressure chamber in said cover plate above each valve, said cover plate having passageways including substantially radial grooves cut in the inner face thereof for admitting pressure fluid to said pressure chambers for operating said diaphragm valves.

2. A fluid distribution device comprising, a body; a cover plate; a plurality of pressure responsive diaphragm valves in said body; a fluid distribution plug in said cover plate, said plug and cover plate having cooperating passageways including communicating grooves in the face of said plug and cover plate adjacent the diaphragm of said valves for admitting pressure fluid to and exhausting pressure fluid from said diaphragm valves.

3. A fluid distribution device for use with a fluid treating apparatus comprising: a housing including a bottom wall and side walls extending upwardly therefrom; partition means between said side walls defining a series of passageways; a series of valve seats on said partition means between said side walls for allowing flow of fluid between certain of said passageways; said housing having an inlet opening for untreated fluid and an outlet opening for discharging said untreated fluid into a fluid treating apparatus; an inlet opening for admitting treated fluid into said housing from said fluid treating apparatus and a discharge opening for discharging treated fluid from said housing; a series of valves in said housing, each valve being cooperable with one of said valve seats, said valves and passageways being arranged so that when only two of said valves are open and the remaining valves are closed, untreated fluid will flow through said housing to the treating apparatus and treated fluid will be returned from and flow through said housing and out of the discharge opening for treated fluid.

4. A fluid distribution device for use with a water softener comprising: a housing including a bottom wall and spaced side walls extending upwardly therefrom; partition means between said side walls defining a series of passageways; a series of valve seats on said partition means between said side walls for allowing flow of fluid between certain of said passageways; said housing having an inlet opening for raw water and an outlet opening for discharging said raw water into a water softener; an inlet opening for admitting softened water into said housing and a discharge opening for discharging softened water from said housing; a series of valves in said housing, each valve being cooperable with one of said valve seats, said valves being arranged so that when only two of said valves are open and the remaining valves are closed, raw water will flow through said housing to the softener and softened water will be returned from said softener and flow through said housing and out of the discharge opening for softened water.

5. A fluid distribution device comprising, a body; a cover plate for said body; a diaphragm interposed between said body and cover plate; a valve seat in said body; a valve secured to said diaphragm and arranged to engage said valve seat; a cavity formed in said cover plate and providing a pressure chamber above said diaphragm; and means for admitting operating fluid to said pressure chamber including a substantially radially extending groove formed in the face of said cover plate adjacent said diaphragm and a passage extending from one end of said groove and opening into the deepest part of said cavity.

6. Fluid distribution apparatus and control means therefor comprising, a housing; a pressure chamber in said housing; a rotatable pilot valve in said pressure chamber; a shaft connected with said pilot valve for rotating the same; means for supplying fluid under pressure to said pressure chamber, said pilot valve being arranged in said pressure chamber so that said fluid urges it against its seat; packing means surrounding said shaft for preventing the escape of pressure fluid from said chamber along said shaft; a fluid distribution device having a plurality of pressure responsive valves therein and a pressure chamber above each of said valves; ports in said pilot valve and passageways in said fluid distribution device for admitting and exhausting operating fluid from said pressure chambers; and common drain means for draining spent operating fluid and any leakage which may get past said shaft packing means from said fluid distribution device and housing.

7. A fluid distribution device comprising: a body including generally concentric side walls and partitions between said side walls defining a series of passageways, said partitions including vertical portions connected by horizontal portions; a plurality of valve seats on said horizontal portions for allowing flow of fluid from one passageway to another; valve means adapted to engage said valve seats; a cover plate enclosing said valve means; and means for controlling the operation of said valve means to cut off or allow flow through said valve seats.

8. A fluid distribution device comprising: a hollow housing having an opening for admitting a fluid thereinto; a second opening for the discharge of said fluid therefrom; a continuous passageway in said housing between said inlet and discharge openings; and three valves operatively associated with said passageway, one of said valves being located adjacent said inlet opening, another of said valves being located adjacent said discharge opening and still another of said valves being located intermediate the other two valves, said valves being arranged to be operated so that flow occurs between said inlet and discharge openings directly through said pasageway when the valve adjacent said discharge opening only is open and the other two valves are closed.

9. A fluid distribution device comprising: a hollow housing having an opening for admitting fluid thereinto; a second opening for the discharge of said fluid therefrom; a continuous passageway in said housing between said inlet and discharge openings; and three valves operatively associated with said passageway, one of said valves being located adjacent said inlet opening, another of said valves being located adjacent said discharge opening, and still another of said valves being located intermediate the other two valves; an injector in said housing arranged to discharge into said discharge opening, said injector being adapted to be connected with a supply of material to be passed through said discharge opening; and passage means in said housing leading to said injector, said intermediate valve being positioned to control flow between said passageway and said passage means, said valves being arranged to be operated so that flow occurs to said injector when the intermediate valve only is open and the other two valves are closed.

10. A fluid distribution device comprising: a housing having an inlet opening, an outlet opening, a return opening, a service opening, and a waste opening; a cover plate; a diaphragm between said cover plate and housing; means securing said cover plate, diaphragm, and housing in assembled relation, said housing having three pairs of passageways therein with each pair including a pair of cooperating valves each consisting of a valve seat in said housing and a valve member carried by said diaphragm, said passageways and valves being arranged and constructed so that the first pair of passageways establish communication between said inlet and return openings, and said return and waste openings when the pair of valves associated therewith is open; the second pair of passageways establish communication between said inlet and outlet openings, and said return and waste openings when the pair of valves associated therewith is open; and the third pair of passageways establish communication between said inlet and outlet openings, and said return and service openings when the pair of valves associated therewith is open; pressure chamber means on one side of said diaphragm associated with each pair of valves; and control means for said pairs of valves arranged and constructed to exhaust operating fluid from the pressure chamber means associated with each of said pairs of valves in succession to effect opening thereof, and to simultaneously admit operating fluid to the pressure chamber means associated with the other pairs of valves to maintain the same closed.

11. A fluid distribution device comprising: a generally circular housing having an inlet opening, an outlet opening, a return opening, a service opening, and a waste opening; a generally circular cover plate; a generally circular diaphragm between said cover plate and housing; means securing said cover plate, diaphragm, and housing in assembled relation, said housing having three pairs of passageways therein with each pair including a pair of cooperating valves each consisting of a valve seat in said housing and a valve member connected with said diaphragm; the valves associated with the respective pairs of passageways being diametrically disposed on equal radii; said passageways and valves being arranged and constructed so that the first pair of passageways establish communication between said inlet and return openings, and said return and waste openings when the pair of valves associated therewith are open; the second pair of passageways establish communication between said inlet and outlet openings, and said return and waste openings when the pair of valves associated therewith are open; and the third pair of passageways establish communication between said inlet and outlet openings, and said return and service openings when the pair of valves associated therewith are open; pressure chamber means in said cover for each pair of valves; and control means for said pairs of valves arranged and constructed to exhaust operating fluid from the pressure chamber means associated with each of said pairs of valves in succession to effect opening thereof, and to simultaneously admit operating fluid to the pressure chamber means associated with the other pairs of valves to maintain the same closed.

12. A fluid distribution device comprising: a housing having an inlet opening, an outlet opening, a return opening, a service opening, and a waste opening; a cover plate; a diaphragm between said cover plate and housing; means securing said cover plate, diaphragm, and housing in assembled relation, said housing having three pairs of passageways therein with each pair including a pair of cooperating valves each consisting of a valve seat in said housing and a valve member carried by said diaphragm, said passageways and valves being arranged and constructed so that the first pair of passageways establish communication between said inlet and return openings, and said return and waste openings when the pair of valves associated therewith is open; the second pair of passageways establish communication between said inlet and outlet openings, and said return and waste openings when the pair of valves associated therewith is open; and the third pair of passageways establish communication between said inlet and outlet openings, and said return and service openings when the pair of valves associated therewith is open; pressure chamber means on one side of said diaphragm associated with each pair of valves; a fluid distribution plug mounted centrally in said cover plate, said fluid distribution plug and cover having three passageways respectively interconnecting the pressure chamber means associated with each pair of valves, said fluid distribution plug having a separate port leading to each of said last-mentioned passageways; and pilot valve means including a ported pilot element for successively exhausting spent operating fluid from the pressure chamber means associated with one pair of valves through one of said ports and simultaneously admitting operating fluid under pressure to the pressure chamber means associated with the other pairs of valves through the other two ports.

13. A fluid distribution device comprising: a housing having an inlet opening, an outlet opening, a return opening, a service opening, and a waste opening; a first passage means in said housing having a valve seat arranged to establish communication between said inlet and outlet openings; a second passage means in said housing having a valve seat arranged to establish communication between said return and service openings; a third passage means in said housing having a valve seat arranged to establish communication between said inlet opening and said return opening; a fourth passage means in said housing having a valve seat arranged to establish communication between said outlet and waste openings; a fifth passage means in said body having a valve seat arranged to establish communication between said inlet and outlet openings; a sixth passage means in said body having a valve seat arranged to establish communication between said return opening and said waste opening; closure means in said housing cooperatively arranged to engage each of said seats to control flow therethrough, the closure means and cooperating seats associated with said first and second passage means constituting a first pair of valves, the closure means and cooperating seats associated with said third and fourth passage means constituting a second pair of valves, and the closure means and cooperating seats associated with said fifth and sixth passage means constituting a third pair of valves; and control means for said valves arranged and constructed to effect opening of one pair of valves and to simultaneously effect closing of the other two pairs of valves, and to effect opening of each pair of valves in succession while maintaining the other two pairs of valves closed.

14. A fluid distribution device comprising: a housing having an inlet opening, an outlet opening, a return opening, a service opening, and a waste opening; a first passage means in said housing having a valve seat arranged to establish communication between said inlet and outlet openings; a second passage means in said housing having a valve seat arranged to establish communication between said return and service openings; a third passage means in said housing, consisting of portions of said first and second passage means, having a valve seat arranged to establish communication between said inlet opening and said return openings; a fourth passage means in said housing, including a portion of said first passage means, having a valve seat arranged to establish communication between said outlet and waste openings; a fifth passage means in said housing, including portions of said first passage means and a valve seat arranged to establish communication between said inlet and outlet openings; a sixth passage means in said housing, consisting of portions of said second and said fourth passage means, having a valve seat arranged to establish communication between said return opening and said waste opening; closure means in said housing cooperatively arranged to engage each of said seats to control flow therethrough, the closure means and cooperating seats associated with said first and second passage means constituting a first pair of valves, the closure means and cooperating seats associated with said third and fourth passage means constituting a second pair of valves, and the closure means and cooperating seats associated with said fifth and sixth passage means constituting a third pair of valves; and control means for said valves arranged and constructed to effect opening of one pair of said valves and to simultaneously effect closing of the other two pairs of valves, and to effect opening of each pair of valves in succession while maintaining the other two pairs of valves closed.

15. A fluid distribution device comprising: a housing having an inlet opening, an outlet opening, a return opening, a service opening, and a waste opening; a first passage means in said housing having a valve seat arranged to establish communication between said inlet and outlet openings; a second passage means in said housing having a valve seat arranged to establish communication between said return and service openings; a third passage means in said housing consisting of portions of said first and second passage means, having a valve seat arranged to establish communication between said inlet opening and said return opening; a fourth passage means in said housing, including a portion of said first passage means, having a valve seat arranged to establish communication between said outlet and waste openings; a fifth passage means in said housing, including portions of said first passage means having a valve seat arranged to establish communication between said inlet and outlet openings; a sixth passage means in said housing, consisting of portions of said second and said fourth passage means, having a valve seat arranged to establish communication between said return opening and said waste opening; a pressure chamber and a pressure responsive valve element associated with each of said seats arranged to engage said seats to control flow therethrough, the valve elements and cooperating seats associated with said first and second passage means constituting a first pair of valves, the valve elements and cooperating seats associated with said third and fourth passage means constituting a second pair of valves, and the valve elements and cooperating seats associated with said fifth and sixth passage means constituting a third pair of valves; and control means for said valves arranged and constructed to exhaust operating fluid from the pressure chambers associated with one pair of said valves to effect opening thereof and to simultaneously admit operating fluid to the pressure chambers associated with the other two pairs of valves, and to effect opening of each pair of valves in succession while maintaining the other two pairs of valves closed.

16. A fluid distribution device comprising: a body having an inlet opening, an outlet opening, a return opening, a service opening, and a waste opening; a first passage means in said body having a valve seat arranged to establish communication between said inlet and outlet openings; a second passage means in said body having a valve seat arranged to establish communication between said return and service openings; a third passage means in said body, consisting of portions of said first and second passage means, having a valve seat arranged to establish communication between said inlet opening and said return opening; a fourth passage means in said body, including a portion of said first passage means, having a valve seat arranged to establish communication between said outlet and waste openings; a fifth passage means in said body, including portions of said first passage means, having an injector disposed therein and a valve seat arranged to establish communication between said inlet and outlet openings through said injector; a sixth passage means in said body, consisting of portions of said second and said fourth passage means, having a valve seat arranged to establish communication between said return opening and said waste opening; a cover plate for said body; diaphragm means between said body and cover plate; a pressure chamber for operating fluid in said cover plate opposite each of said valve seats; a valve member secured to said diaphragm means in aligned relation to said valve seats arranged to engage said seats to control flow therethrough, the valve members and cooperating seats associated with said first and second passage means constituting a first pair of valves, the valve members and cooperating seats associated with said third and fourth passage means constituting a second pair of valves, and the valve members and cooperating seats associated with said fifth and sixth passage means constituting a third pair of valves; and control means for said valves arranged and constructed to exhaust operating fluid from the pressure chambers associated with one pair of said valves to effect opening thereof and to simultaneously admit operating fluid to the pressure chambers associated with the other two pairs of valves, and to effect opening of each pair of valves in succession while maintaining the other two pairs of valves closed.

DONALD G. GRISWOLD.